J. IRVING, Jr.
PRECIPITATING APPARATUS.
APPLICATION FILED SEPT. 14, 1915.
1,177,109.  Patented Mar. 28, 1916.
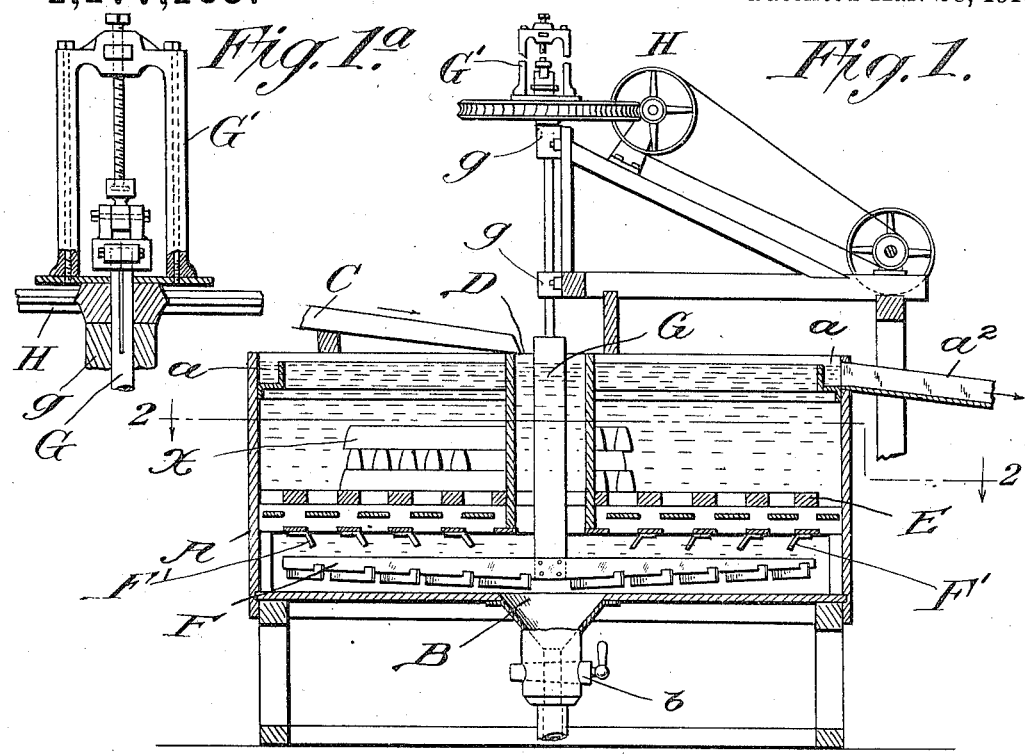
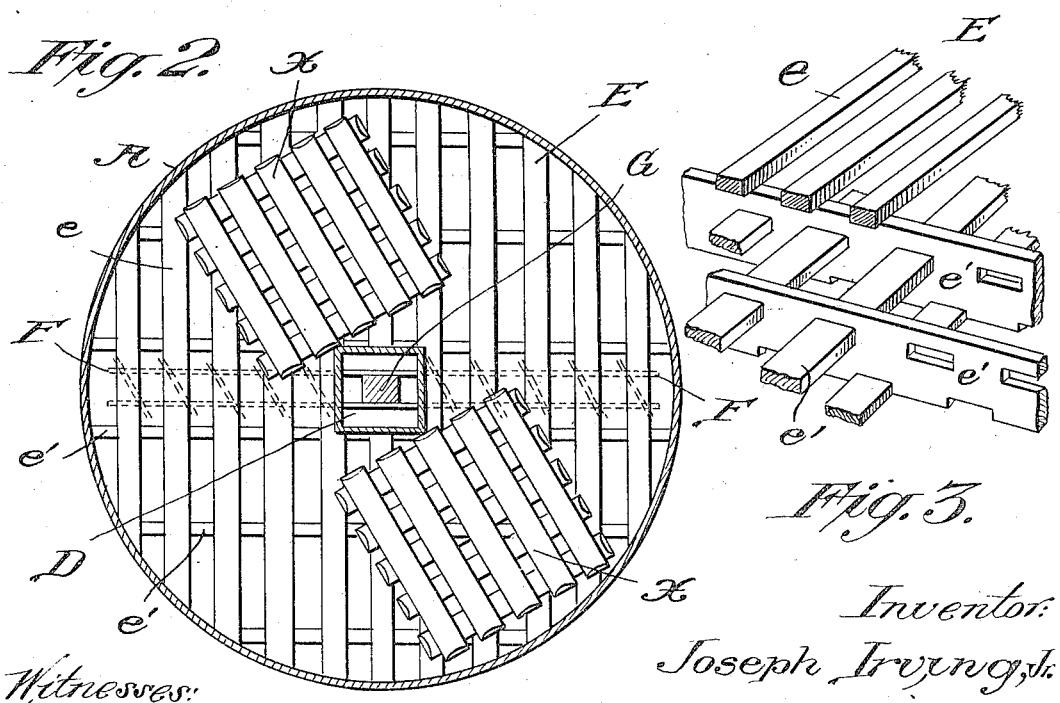
Inventor:
Joseph Irving, Jr.
By his Attorneys:
Baldwin Wight
Witnesses:
P. J. Gathmann

UNITED STATES PATENT OFFICE.

JOSEPH IRVING, JR., OF DOUGLAS, ARIZONA, ASSIGNOR TO THE DORR CYANIDE MACHINERY COMPANY, OF DENVER, COLORADO.

PRECIPITATING APPARATUS.

1,177,109. Specification of Letters Patent. Patented Mar. 28, 1916.

Application filed September 14, 1915. Serial No. 50,616.

*To all whom it may concern:*

Be it known that I, JOSEPH IRVING, Jr., a subject of the King of Great Britain, residing in Douglas, in the county of Cochise and State of Arizona, have invented certain new and useful Improvements in Precipitating Apparatus, of which the following is a specification.

This invention relates to apparatus for precipitating elements of various kinds from their solutions and particularly to precipitating apparatus in which coarse precipitants are employed upon which a loosely adhering precipitate is formed.

My invention is primarily intended for use in precipitating copper from copper-bearing liquors, but is not limited thereto.

A common method of precipitating copper from copper-bearing liquors is to bring the liquor into contact with iron in scrap or pig iron form in such manner that the copper will be precipitated on the iron from which it may be removed or from which it detaches itself and drops into a suitable receptacle.

A well known method is to precipitate the copper in launders containing pig or scrap iron. In such system the parts of the apparatus are distributed over quite an extensive area, involving considerable labor in placing and removing the iron and in collecting the precipitate. In such system, also, the iron is placed on the bottom of the launders, necessitating its removal therefrom for cleaning purposes, at frequent intervals. In so doing the iron is exposed to atmospheric conditions which cause it to quickly oxidize.

According to my invention, I provide a precipitating tank or vessel to which the liquor is conveyed and which is provided with means for removing from the top of the vessel the barren or treated liquid and with a reticulated precipitant-supporting frame below which are mounted, to slowly rotate, flights or scrapers which serve to discharge the precipitate and also to distribute the solution beneath the precipitant through which it rises.

By the use of my apparatus, as will be hereinafter more fully explained, precipitation may be carried on continuously in a centralized apparatus from which the precipitate as formed is continuously removed and which may be cleaned without such exposure to the atmosphere as would cause the oxidation of the precipitant and consequent adulteration of the precipitate.

In the accompanying drawings: Figure 1 shows a vertical central section through a precipitating apparatus embodying my improvements. Fig. 1ª is a detail view of lifting devices which may be used for raising and lowering the flights or scrapers employed. Fig. 2 shows a transverse section on the line 2—2 of Fig. 1. Fig. 3 is a detail view in perspective, showing the preferred construction of the precipitant-supporting frame.

The vessel A is preferably of cylindrical form and is provided with an overflow launder $a$ and an outlet or discharge opening B equipped with a cock or valve $b$. The feed trough C delivers to a vertically arranged box, well or hopper D, which extends to the underside of the frame E that supports the precipitant. Below the frame E are flights or scrapers F, attached to a vertical shaft G, supported and guided by the bearings $g$ and connected at its upper end to driving mechanism H of any suitable kind, by means of which it may be slowly rotated. A lifting device G′, of well-known construction, may be applied to the shaft G by means of which the shaft and the attached flights or scrapers F may be raised and lowered and held at any desired level.

The open-work frame E is preferably constructed as shown, *i. e.*, it comprises a superstructure composed of wooden cross-pieces $e$ and an understructure composed of interlocking cross-pieces, which may be planks or boards $e'$. The cross-pieces of the two structures are separated from themselves and from each other, as shown, so as to provide staggered spaces or communications between the upper part of the tank and the lower part thereof in order that the bars of iron or large pieces thereof or other precipitant may not fall through the frame to the bottom of the tank. The different bars or parts of the precipitant should be so arranged that interstices are formed through which the liquor and the precipitate may freely pass. The carrying liquor is fed continuously through the trough C to the well or hopper D and then it continues to the lower portion of the vessel below the frame E. It then spreads outwardly and is distributed by the action of the baffles F′ and flights F and then rises through the reticulated frame coming in contact with the precipitant, the treated liquor overflowing into the launder $a$ and passing therefrom by the outlet $a^2$ back to the mill or to any suitable receptacle. The baffles F' assist in causing an even distribution of the liquid.

In the operation of the apparatus the carrying liquid, being of greater specific gravity than the treated liquor will displace the latter which on account of its lower specific gravity rises to the overflow. The precipitated copper or other precipitate drops from the precipitant, passes through the frame E and collects on the bottom of the precipitating vessel. The scrapers or flights which revolve quite slowly, gently move the precipitate to the outlet B either continuously or intermittently, and the discharged material may be conveyed away for further treatment or to a suitable receptacle. The scrapers or flights are adjustable vertically as before stated, so that they may be made to operate in any desired horizontal plane.

It will be understood, therefore, that my invention comprehends a reticulated frame on which the precipitant is supported and which is so constructed that the precipitant cannot drop to the bottom of the precipitating vessel, and also slowly moving flights or scrapers which assist in continuously discharging the deposited material and also serve to spread the incoming liquor beneath the precipitant-supporting frame and it also involves a feed box, well or hopper which serves to convey the incoming liquor to that portion of the precipitating tank below the precipitant-supporting frame where it is evenly distributed and rises uniformly through the interstices of the precipitant to the upper portion of the precipitating vessel from which it is continuously removed.

While, as before stated, my apparatus is especially intended for use in precipitating copper, it should be borne in mind that it may be used for other purposes. For instance, it may be used for precipitating ferric hydrate from liquors carrying ferric sulfate by the use of lime as a precipitant. In such case, limestone may be used as a precipitant and should be supported on the reticulated frame, the ferric hydrate formed descending to the bottom of the vessel and being continuously removed by the flights.

I claim as my invention:

1. A precipitating apparatus, comprising a vessel having a discharge opening at the bottom and a precipitant-supporting reticulated frame through which the liquor passes, and slowly revolving scrapers or flights below the frame for moving the precipitate to the discharge opening and for spreading the incoming liquid beneath the supporting frame.

2. A precipitating apparatus, comprising a vessel having a feed hopper and a discharge opening, a precipitant-supporting reticulated frame through which the liquor passes from the hopper, and slowly revolving scrapers or flights below the frame for moving the precipitate to the discharge opening and for spreading the liquor under the frame.

3. A precipitating apparatus, comprising a vessel having a downwardly delivering feed hopper and a normally open discharge opening, a precipitant-supporting reticulated frame through which the precipitate descends and the liquor rises and means for carrying away the treated liquor from that part of the vessel above the frame.

4. A precipitating apparatus, comprising a vessel having a feed hopper and a discharge opening, a precipitant-supporting reticulated frame through which the precipitate descends and the liquor rises, means for carrying away the treated liquor from that part of the vessel above the frame, slowly revolving scrapers or flights below the frame for moving the precipitate to the discharge opening and for spreading the incoming liquid beneath the supporting frame and means for adjusting said scrapers or flights to different horizontal planes.

5. A precipitating apparatus, comprising a vessel having a discharge opening in its bottom, a precipitant-supporting frame consisting of a superstructure made of separated cross-pieces and an understructure consisting of spaced cross-pieces separated from the superstructure and from each other and staggered with the cross-pieces of the superstructure.

6. A precipitating apparatus, comprising a vessel having a feed hopper to which the material is continuously fed, a discharge opening through which the settled material is continuously delivered, a precipitant-supporting reticulated frame through which the liquor passes from the hopper, and an overflow for the vessel to which the liquor continuously rises.

In testimony whereof, I have hereunto subscribed my name.

JOSEPH IRVING, Jr.

Witnesses:
 Ed. C. Bradford,
 Alexander Baird, Jr.